(12) United States Patent
Makharia et al.

(10) Patent No.: US 8,964,680 B2
(45) Date of Patent: Feb. 24, 2015

(54) RADIO MULTIPLEXER AWARE TCP LAYER

(71) Applicant: Apple Inc., Cupertino, CA (US)

(72) Inventors: Shivesh Makharia, Santa Clara, CA (US); Tahir Shamim, San Jose, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 13/761,798

(22) Filed: Feb. 7, 2013

(65) Prior Publication Data

US 2014/0219184 A1 Aug. 7, 2014

(51) Int. Cl.
*H04W 4/00* (2009.01)
*H04L 12/66* (2006.01)
*H04W 28/18* (2009.01)

(52) U.S. Cl.
CPC .................................... *H04W 28/18* (2013.01)
USPC ............................. 370/329; 370/341; 370/352

(58) Field of Classification Search
None
See application file for complete search history.

(56) References Cited

U.S. PATENT DOCUMENTS

| | | | |
|---|---|---|---|
| 6,961,780 B2 | 11/2005 | Kuusinen et al. | |
| 7,957,411 B2 | 6/2011 | Gonikberg et al. | |
| 2001/0049731 A1* | 12/2001 | Kuusinen et al. | 709/223 |
| 2006/0007877 A1* | 1/2006 | Vaittinen et al. | 370/328 |
| 2007/0211693 A1 | 9/2007 | Hirsimaki et al. | |
| 2008/0268825 A1* | 10/2008 | Allen et al. | 455/415 |
| 2011/0149853 A1* | 6/2011 | Olsson et al. | 370/328 |
| 2011/0164589 A1* | 7/2011 | Lee et al. | 370/331 |
| 2011/0205967 A1* | 8/2011 | Ping | 370/328 |
| 2012/0207040 A1 | 8/2012 | Comsa et al. | |
| 2012/0309397 A1* | 12/2012 | Rao et al. | 455/437 |
| 2013/0196637 A1* | 8/2013 | Allen et al. | 455/414.1 |

* cited by examiner

*Primary Examiner* — Chi H Pham
*Assistant Examiner* — Soon-Dong D Hyun
(74) *Attorney, Agent, or Firm* — Meyertons, Hood, Kivlin, Kowert & Goetzel, P.C.

(57) ABSTRACT

Improving transmission control protocol (TCP) uplink performance of a wireless user equipment (UE) device which multiplexes radio resources between multiple radio access technologies (RATs). Radio control may be provided to a radio resource control (RRC) entity that operates according to a first RAT at a first time. The first RAT may utilize TCP packet-switched (PS) communications. As a second time, radio control may be provided to an RRC entity that operates according to a second RAT which utilizes circuit-switched communications in order to check for paging messages. Radio control by the first RAT's RRC entity may be suspended while radio control is provided to the second RAT's RRC entity. An indication that radio control by the first RAT's RRC entity is suspended may be provided to a TCP entity that operates according to the first RAT. The TCP entity may suspend an uplink retransmission timer in response to the indication.

20 Claims, 6 Drawing Sheets

US 8,964,680 B2

RADIO MULTIPLEXER AWARE TCP LAYER

FIELD

The subject matter disclosed herein relates to the field of wireless communication, and more particularly to a system and method for improving TCP uplink performance in a wireless device which multiplexes radio resources between multiple radio access technologies.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

An alternative might include a device which uses a single functional block (e.g., a single radio) to implement multiple wireless communication technologies. However, sharing a single radio between multiple wireless technologies has its own set of challenges. For example, if only one wireless technology can use the radio at a time, there may occasionally (or frequently) be conflicts between the wireless technologies for use of the radio. Accordingly, improvements in wireless communications and devices performing wireless communications would be desirable.

SUMMARY

As noted above, a device which uses a single functional block (e.g., a single radio) to implement multiple wireless communication technologies may have significant advantages relative to a device which uses separate functional blocks (e.g., separate radios) to implement different wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

As one example, consider a device which implements a first RAT for packet-switched (e.g., data) services and a second RAT for circuit-switched (e.g., voice) services. The radio resources of the device may be multiplexed between the RATs, such that only one protocol stack may be granted radio resources at a time. Thus, any active operations according to one of the RATs would be suspended if radio resources were shifted to the other RAT. Further, such resource shifts may be relatively frequent occurrences if, as may be common, each of the RATs utilizes periodic paging cycles to check for incoming calls or data (pushes) and/or maintain network connectivity (e.g., perform cell measurements, re-selection, registration, etc., as necessary).

Thus in this case, if an active data session happens to be ongoing on the PS RAT, the radio may periodically be shifted ("tuned away") to the CS RAT to check for paging messages. The PS RAT may accordingly experience periods of normal connectivity interrupted by occasional "silence" periods of no transmission or reception during times when the radio is tuned away to the CS RAT.

If the protocol stack according to the first RAT utilizes transmission control protocol (TCP) (or potentially any other "reliable" protocol which utilizes acknowledgements to confirm packet delivery), this has the potential to be problematic as the TCP layer may not inherently be able to distinguish between silences which are due to radio resources being tuned away from the PS RAT or poor RF conditions. Thus, if no consideration is given to this possibility, the TCP uplink re-transmission timer might rapidly and repeatedly expire during tune-away times, potentially causing multiple re-transmission attempts for uplink data, and possibly even triggering congestion recovery mechanisms or other responses which are intended for use in poor RF conditions. Such mechanisms may inappropriately throttle bandwidth and/or otherwise negatively affect uplink performance of the PS RAT once the radio resources are tuned back to the PS RAT.

Accordingly, providing a more intelligent way of managing TCP layer operation, and in particular uplink performance, for wireless devices which multiplex radio resources between multiple RATs, may be an important consideration. The present disclosure relates to such a system and method for improving TCP uplink performance in a wireless device which multiplexes radio resources between multiple RATs. Embodiments of the disclosure may thus be directed to such a method for improving TCP uplink performance in a wireless user equipment (UE) device which multiplexes radio resources, to a UE device configured to implement such a method, and/or to a computer accessible memory medium storing program instructions executable by a processor to implement such a method.

In particular, by providing indications to a TCP layer in a UE when radio resources are switched away from the PS RAT, the TCP layer may suspend its uplink re-transmission timer while operations according to the PS RAT are suspended. Further, by providing indications to the TCP layer when radio resources are switched back to the PS RAT, the TCP layer may resume its uplink re-transmission timer once operations according to the PS RAT are resumed. Alternatively or in addition, (e.g., if the radio is tuned away from the PS RAT for a longer period of time, such as if an incoming voice call is answered on the CS RAT), the TCP layer may resume the uplink re-transmission timer after a predetermined period of time (a "retransmission timeout guard-interval") if PS operations have not resumed yet, in order to avoid suspending the re-transmission timer indefinitely.

Thus, according to the present disclosure, by informing the TCP entity in a UE for which radio resources are multiplexed between multiple RATs when those radio resources are multiplexed away from the RAT by which the TCP entity communicates, inappropriate penalties to TCP uplink transmission which might otherwise arise may advantageously be avoided, among various possible benefits.

BRIEF DESCRIPTION OF THE DRAWINGS

A better understanding of the present subject matter can be obtained when the following detailed description of the preferred embodiment is considered in conjunction with the following drawings, in which.

Figure 1:
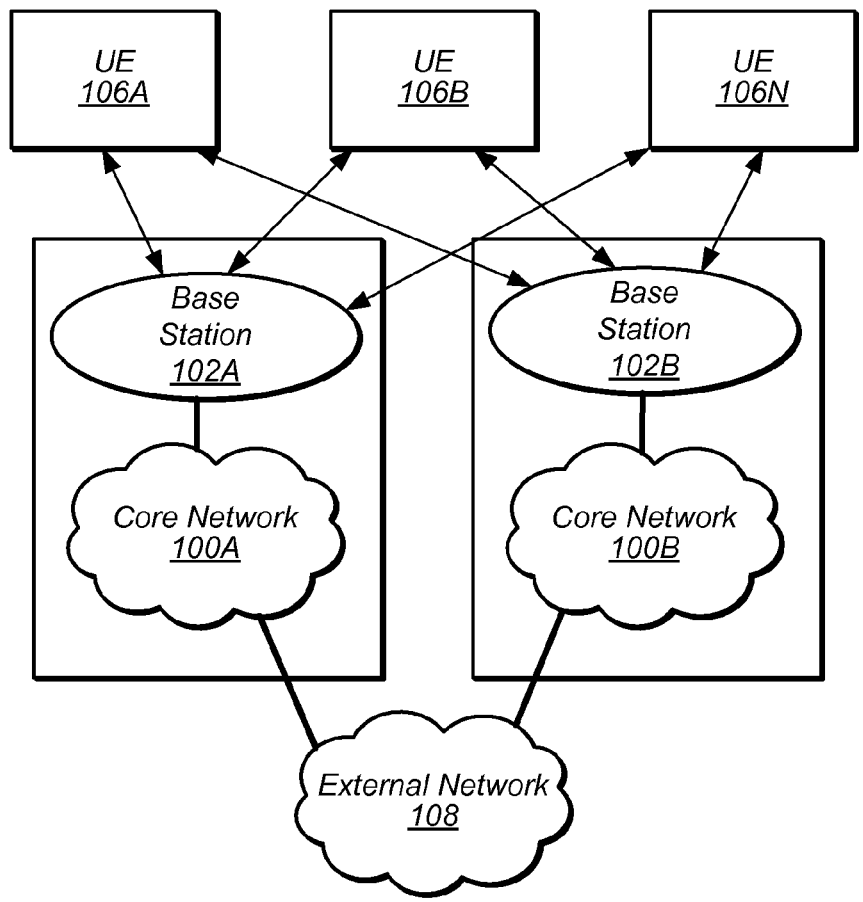
FIG. 1 illustrates an exemplary wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms
  The following acronyms are used in the present disclosure.
  3GPP: Third Generation Partnership Project
  3GPP2: Third Generation Partnership Project 2
  GSM: Global System for Mobile Communications
  UMTS: Universal Mobile Telecommunications System
  LTE: Long Term Evolution
Terms
  The following is a glossary of terms used in the present disclosure:
  Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
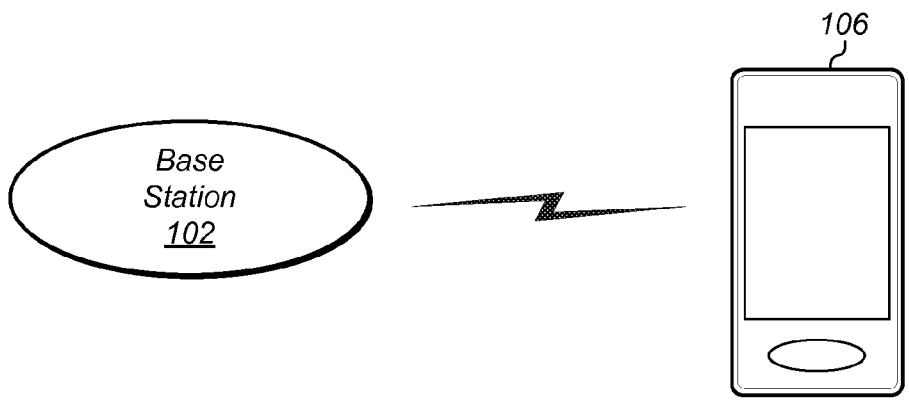
FIG. 2 illustrates a base station in communication with a user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A and 102B which communicate over a transmission medium with one or more user devices 106A through 106N. Each of the user devices may be referred to herein as a "user equipment" (UE). Thus, the user devices are referred to as UEs or UE devices.

The base stations 102 may be base transceiver stations (BTS) or cell sites, and may include hardware that enables wireless communication with the user devices 106A through 106N. Each base station 102 may also be equipped to communicate with a core network 100 (Base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX) etc.

Base station 102A and core network 100A may operate according to a first cellular communication standard (e.g., LTE) while base station 102B and core network 100B operate according to a second (e.g., different) cellular communication standard (e.g., one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 1, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA2000 1xRTT, or any other combination of cellular communication technologies) might be coupled to a core network that also supports the different cellular communication technologies. Any of various other network deployment scenarios are also possible.

A UE 106 may be capable of communicating using multiple wireless communication standards. For example, a UE 106 might be configured to communicate using either of a 3GPP cellular communication standard (such as LTE) or a 3GPP2 cellular communication standard (such as a cellular communication standard in the CDMA2000 family of cellular communication standards). Thus, UE 106 might be configured to communicate with base station 102A according to the first cellular communication standard (e.g., LTE) and might also be configured to communicate with base station 102B according to the second cellular communication standard (e.g., CDMA2000 1xRTT). The UE 106 might, for example, utilize one cellular communication standard (e.g., LTE) for packet-switched (PS) services, such as data services, and utilize another communication standard (e.g., CDMA 2000 1xRTT) for circuit-switched (CS) services, such as voice services.

Base stations 102A and 102B and other base stations operating according to the same or different cellular communication standards may thus be provided as a network of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

As noted above, the UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1xRTT/1xEV-DO/HRPD/eHRPD) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT, and separate radios for communicating using each of Wi-Fi and Bluetooth. Other configurations are also possible.

Figure 3:
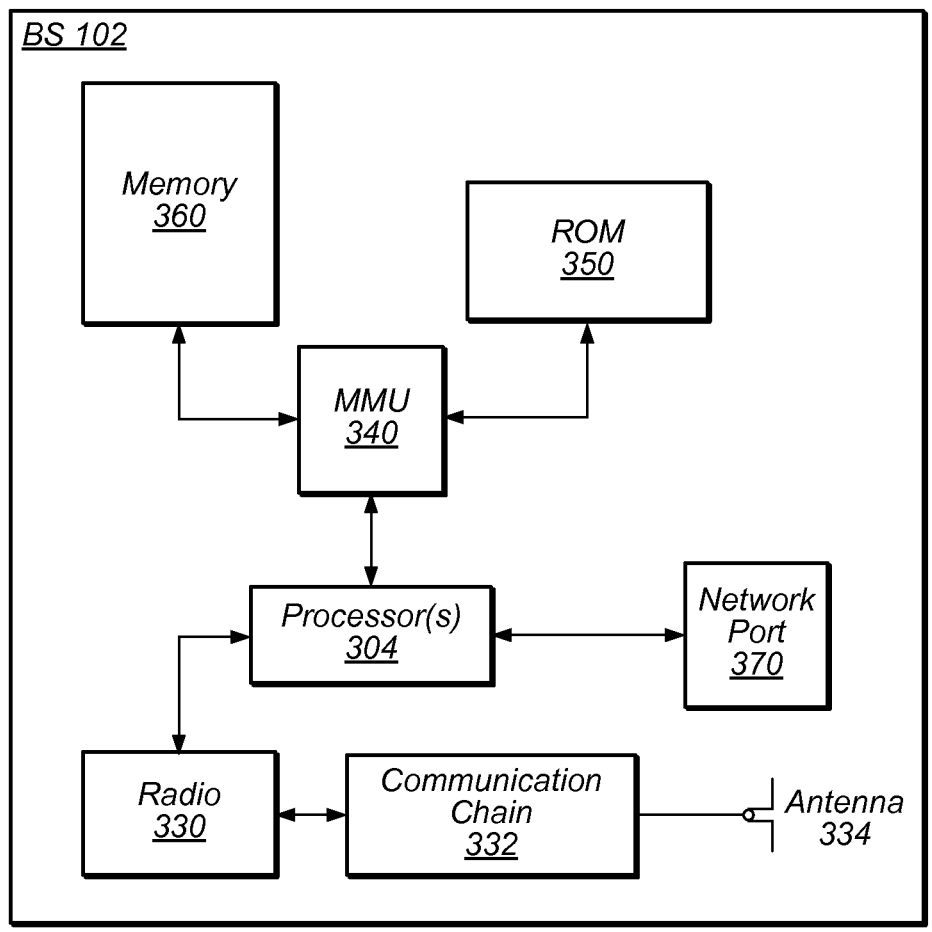
FIG. 3 is an example block diagram of a base station.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to an arbitrary number of devices, such as UE devices 106. In some cases, the network port 370 may couple to a telephone network via the core network, and/or the core network may provide a telephone network (e.g., among other UE devices serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless telecommunication standards, including, but not limited to, LTE, WCDMA, CDMA2000, etc.

The processor 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 4:
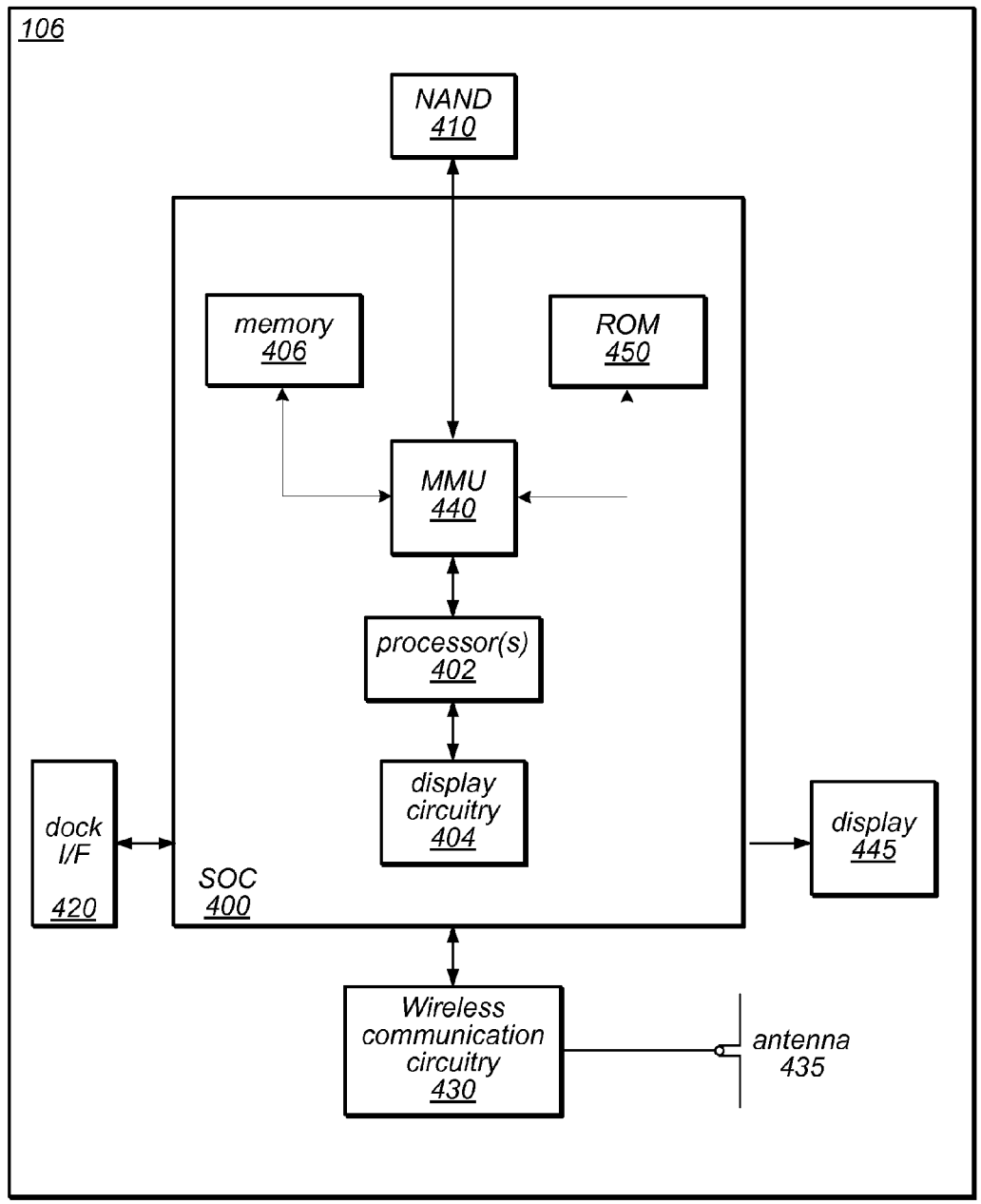
FIG. 4 is an example block diagram of a user equipment device.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 445. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 445. The MMU 440 may be configured to perform memory protection and page table translation or set up. In some embodiments, the MMU 440 may be included as a portion of the processor(s) 402.

As shown, the SOC 400 may be coupled to various other circuits of the UE 106. For example, the UE 106 may include various types of memory (e.g., including NAND flash 410), a connector interface 420 (e.g., for coupling to a dock, charging station, computer system, and/or any other device), the display 445, and wireless communication circuitry 430 (e.g., for LTE, LTE-A, CDMA2000, Bluetooth, WiFi, etc.).

The UE device 106 may include at least one antenna, and possibly multiple antennas, for performing wireless communication with base stations and/or other devices. For example, the UE device 106 may use antenna 435 to perform the wireless communication. As noted above, the UE may be configured to communicate wirelessly using multiple wireless communication standards.

Figure 6:
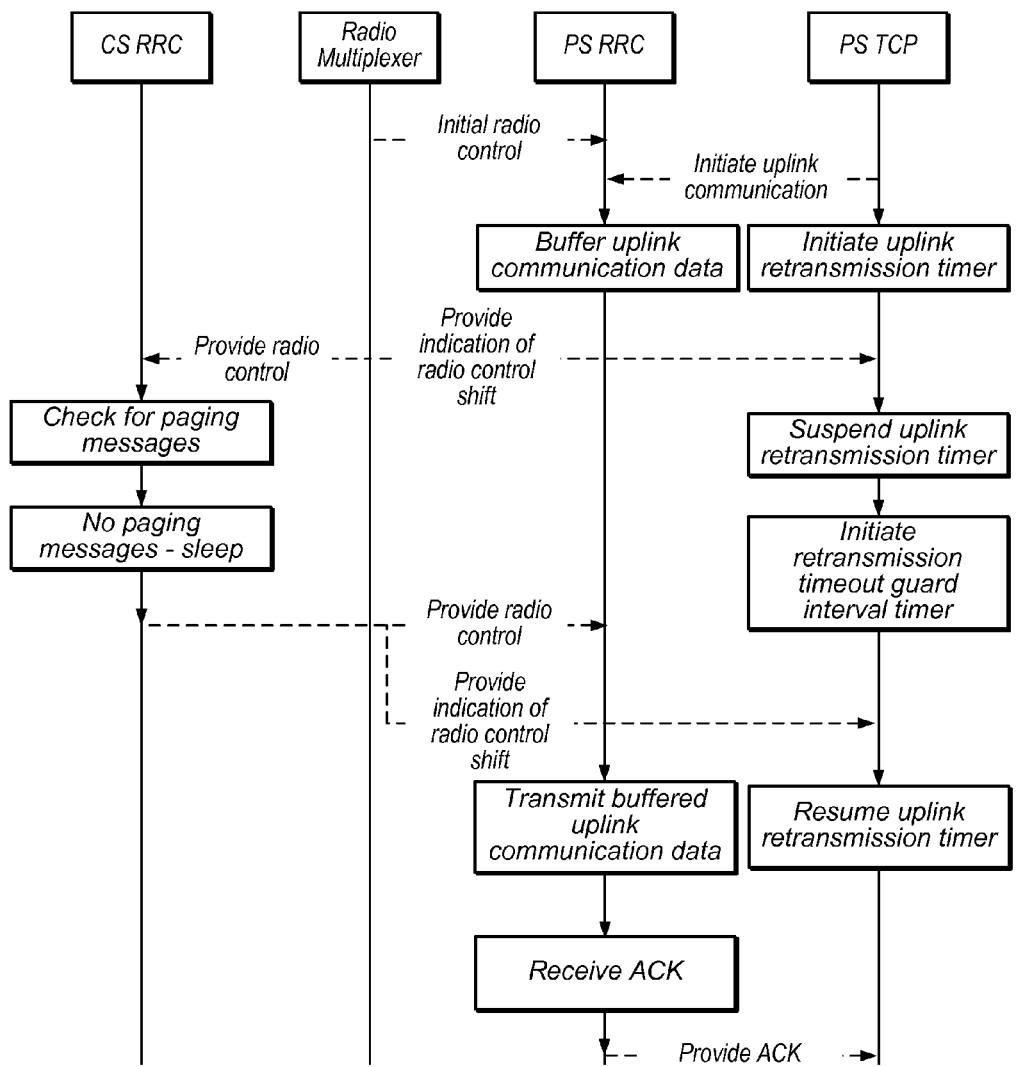
FIGS. 6-7 are communication flow diagrams illustrating aspects of an exemplary method for improving TCP uplink performance in a multi-RAT user equipment device.
Figure 7:
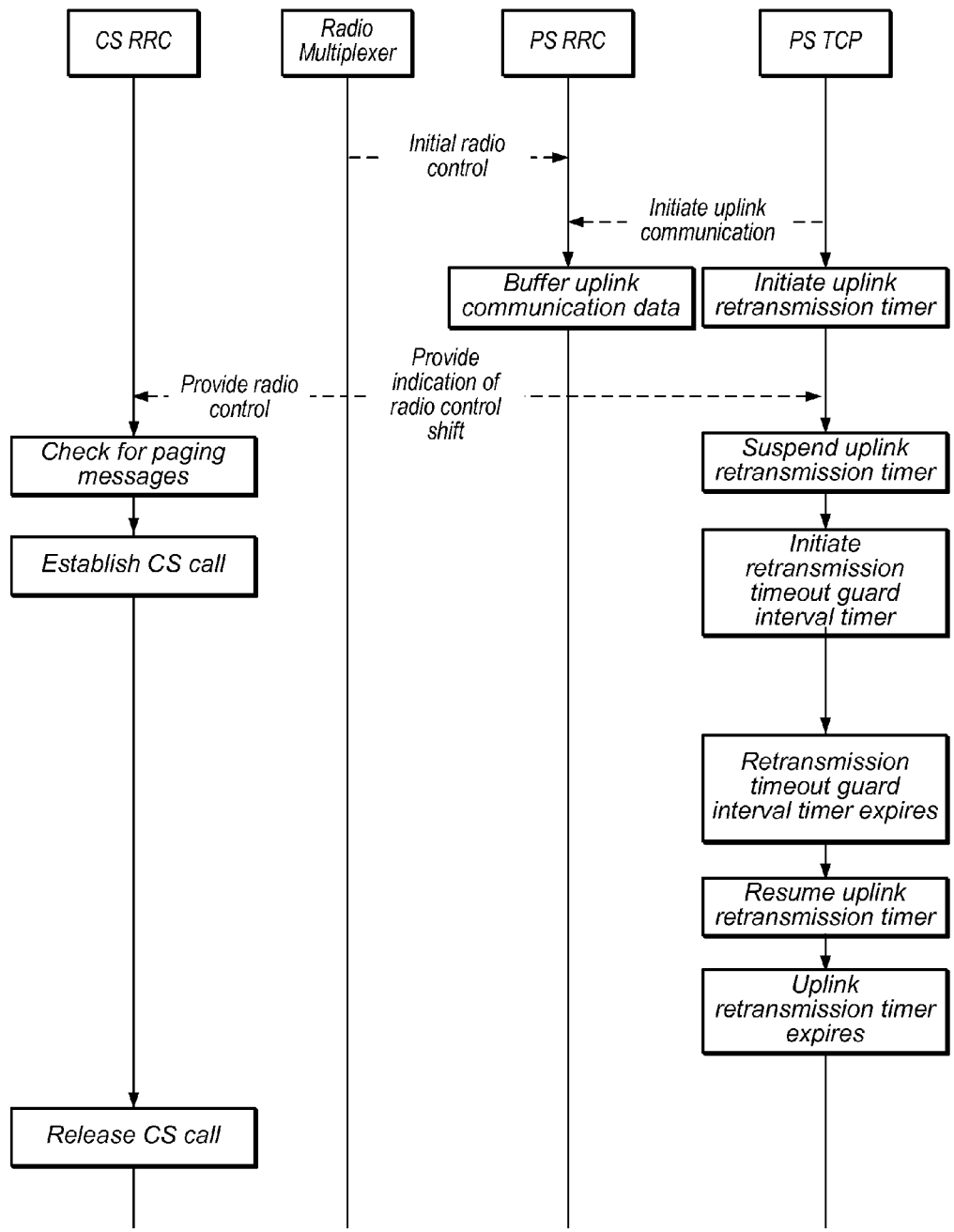

As described herein, the UE 106 may include hardware and software components for implementing features for improving TCP uplink performance such as those described herein with reference to, inter alia, FIGS. 6-7. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 445, 450 may be configured to implement part or all of the features described herein, such as the features described herein with reference to, inter alia, FIGS. 6-7.

Figure 5:
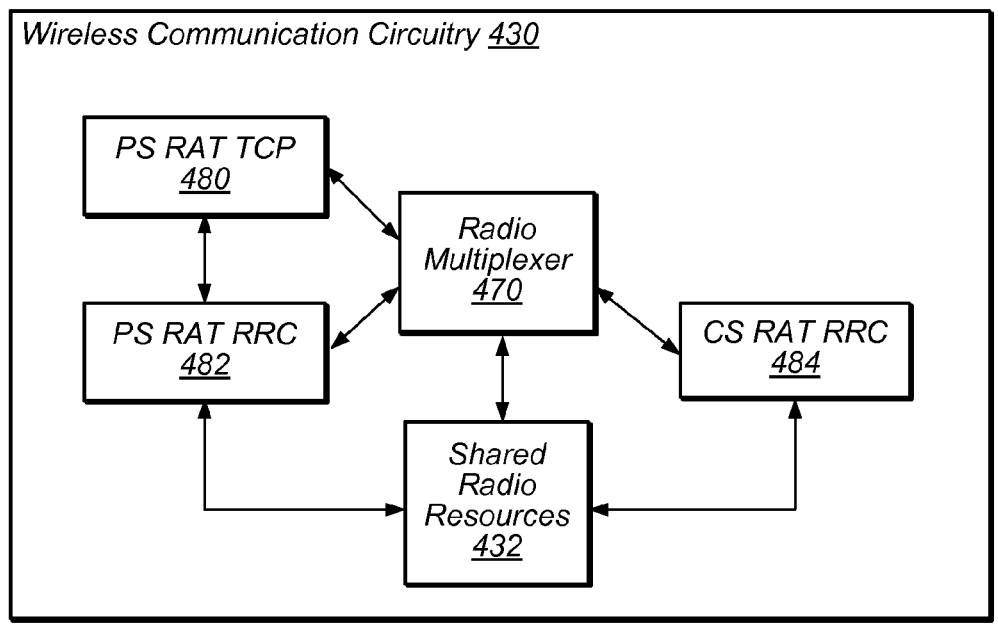
FIG. 5 is an example block diagram of selected functional components of wireless communication circuitry in a user equipment device.

FIG. 5—Wireless Communication Circuitry

FIG. 5 illustrates an exemplary block diagram of selected components of the wireless communication circuitry 430 of the UE 106 illustrated in FIG. 4 according to various embodiments. In particular, FIG. 5 illustrates selected components of a UE 106 which is configured to operate according to multiple radio access technologies (RATs), and which multiplexes at least some shared radio resources between those RATs. It should be noted that while FIG. 5 illustrates possible selected components of the wireless communication circuitry 430 of the UE 106 according to one possible implementation, numerous other components (e.g., protocol stack layers, hardware components, etc., which are omitted from FIG. 5 for the sake of clarity) may also be included in the wireless communication circuitry 430. It should additionally be noted that numerous alternative component arrangements are also possible, potentially including arrangements in which the logical functionality of one or more of the illustrated components (or a portion thereof) is combined with one or more other UE components, and/or in which the logical functionality of one or more of the illustrated components is split out into multiple other components, among various possibilities.

The wireless communication circuitry may include a protocol stack for each RAT. One of the RATs may be a RAT which provides packet-switched (PS) communication capability, and in particular which is capable of providing transmission control protocol (TCP) based PS communications, such as may commonly be provided for at least some data sessions in many devices. As shown, the PS RAT protocol stack may include a TCP layer (entity) 480 and a radio resource control (RRC) layer (entity) 482, among various possible layers.

The other of the RATs may be a RAT which provides circuit-switched (CS) communication capability, such as may commonly be provided for voice communications (voice calls) in many devices. As shown, the CS RAT may include an RRC layer (entity) 484, among various possible layers.

Both the PS RAT RRC layer 482 and the CS RAT RRC layer 484 may be configured to utilize certain shared radio resources 432 of the UE 106. For example, one or more components, such as antennas, gain elements, switches, mixers, processing elements, memory elements, etc., might be shared between the PS RAT and the CS RAT. Any number of alternative or additional types of radio resources might be shared between the PS RAT and the CS RAT, according to the configuration of the UE 106 and as desired.

In order to multiplex the shared radio resources 432, a "radio multiplexer" 470 component/entity may also be provided. The radio multiplexer 470 may shift the shared radio resources between the CS RAT and the PS RAT as determined to be appropriate, e.g., based on communication needs/timing and relative priorities of the different RATs. For example, radio resources might be provided to the CS RAT according to scheduled paging opportunities for the CS RAT, and remain with the CS RAT if active communication (e.g., a voice call) is initiated, and may be provided to the PS RAT at all other times. Any number of other arrangements for shifting the radio resources between the RATs are of course also possible.

Note that while the radio multiplexer 470 is illustrated, and may be implemented separately/independently from either of the CS RAT or PS RAT protocol stacks, it may also be possible that one RAT's protocol stack may include the radio multiplexer 470, and thus may act in a sense as a "master", while the other RAT's protocol stack may act as a "slave".

Note also that, at least in some cases, the protocol stacks for each RAT (or at least certain layers of each RAT's protocol stack) may not inherently be aware of each other, and/or may more generally not inherently (natively) know that their radio resources are subject to being shifted/suspended. For example, when the PS RAT RRC 482 operation is suspended in order for the CS RAT RRC 484 to check for paging messages, the PS RAT TCP layer 480 may not natively be able to detect this. Accordingly, if the PS RAT TCP layer 480 has initiated an uplink communication, including providing data for uplink transmission to the PS RAT RRC layer 482 and initiating an uplink retransmission timer, but the PS RAT RRC 482 does not have control of the shared radio resources, the uplink data may sit in an uplink buffer of the PS RAT RRC layer 482 until control of the shared radio resources is provided back to the PS RAT RRC layer 482. Meanwhile, the uplink retransmission timer at the PS RAT TCP layer 480 might expire, initiating a retransmission attempt of the same uplink data which is already in the uplink buffer of the PS RAT RRC layer 482 by the PS RAT TCP layer 480.

This may be a particularly plausible scenario if the PS RAT is a high bandwidth, low latency technology, such that the typical TCP round trip time (RTT) may be very low as long as the PS RAT RRC layer 482 has control of the shared radio resources and is able to communicate over the air, particularly since the retransmission timeout (RTO) (i.e., the amount of time after which the retransmission timer expires) may be defined as a function of past (particularly recent) RTT samples. In this case, even a brief shift or "tune-away" of the shared radio resources 432 to the CS RAT RRC 484 to check for paging messages may cause multiple RTOs and retransmission attempts, which may in turn result in the PS RAT TCP layer 480 declaring that data (e.g., one or more packets) has been lost.

This, in turn, may result in the initiation of congestion recovery mechanisms. For example, the PS RAT TCP layer 480 might reduce its transmission window, attempt to transmit less data, and/or otherwise reduce its bandwidth in a manner which might be appropriate for poor RF conditions, but which may result in inefficient use of actual link bandwidth when the actual cause is temporary multiplexing of the shared radio resources 432 away from the PS RAT RRC layer 482.

Accordingly, it may be desirable for the radio multiplexer 470 to inform the PS RAT TCP layer 480 when the shared radio resources 432 are shifted away from (and back to) the PS RAT RRC layer 482. This may allow the PS RAT TCP layer 480 to temporarily suspend (and resume) its uplink retransmission timer(s) as appropriate based on which RAT has control of the shared radio resources 432, which may in turn help avoid unnecessary and inappropriate retransmission attempts and/or congestion recovery mechanisms by the PS RAT TCP layer 480. As further described subsequently herein, FIGS. 6-7 relate to a method for improving TCP uplink performance in a device which multiplexes radio resources between multiple RATs which advantageously implements such and other beneficial features.

FIGS. 6-7—Flowcharts

FIGS. 6-7 are communication flow diagrams illustrating aspects of a method for improving TCP uplink performance in a wireless device which multiplexes radio resources between multiple radio access technologies (RATs). The method may be implemented by a wireless UE device (such as UE 106), which may be configured to communicate using multiple RATs. The method shown in FIGS. 6-7 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

The UE 106 may be configured to communicate using multiple RATs (e.g., multiple cellular communication protocols) using a shared radio, or at least some shared radio resources. For example, one or more RF signaling components, such as one or more antennas, gain elements, filtering elements, ADCs and/or DACs, and/or other analog or digital circuitry may be used to perform wireless communication by the UE according to any of the multiple RATs using the shared radio resources. Note that not all RF components may need to be shared by the RATs for the radio to be considered shared (e.g., only some radio resources may be shared, if desired). It may be the case that at any given time, only one of the RATs sharing a radio may use the radio.

Sharing a radio between two (or more) RATs may be advantageous for energy efficiency, manufacturing cost, and form factor of a UE 106, among other possible advantages. However, if only one of the RATs can operate at a time, it may be the case that as radio resources are transferred from one RAT to another RAT, active operations according to the RAT which does not currently have radio control may be suspended. Furthermore, according to many configurations, relatively frequent transfers of radio control between RATs may be common, such that at least one RAT (e.g., a lower priority RAT) if not multiple RATs (e.g., if similar priority is given to both RATs) may have their operations temporarily suspended relatively frequently. In order to manage the shared radio resources between the multiple RATs, a radio multiplexer may be provided, such as illustrated in and described hereinabove with respect to FIG. 5.

As similarly illustrated in and described hereinabove with respect to FIG. 5, one of the RATs may be a RAT which provides CS communications (a "CS RAT"), such as CDMA 2000 1xRTT, GSM, UMTS (which may also be capable of providing PS communications), etc. An RRC entity ("CS RRC") which operates according to the CS RAT may control radio usage while the CS RAT is provided with radio control.

In addition, as also illustrated in and described hereinabove with respect to FIG. 5, one of the RATs may be a RAT which provides PS communications (a "PS RAT"), such as CDMA 2000 EV-DO/HRPD/eHRPD, GPRS/EDGE, UMTS (which, as noted above, may also be capable of providing CS communications), LTE, LTE-A, etc. An RRC entity ("PS RRC") which operates according to the PS RAT may control radio usage while the PS RAT is provided with radio control. The PS RAT protocol stack may also include a TCP layer ("PS TCP") logically above the PS RAT RRC layer, e.g., for supporting TCP based PS communications.

As shown in FIGS. 6-7, initially, radio control may be provided to the PS RRC. The PS TCP may, at some time while the PS RRC has control of the radio, initiate an uplink communication. This may include providing data (packets) for uplink transmission to the PS RRC. As TCP is a "reliable" transport protocol, an uplink retransmission timer may be initiated for each uplink communication. The uplink retransmission timer may have a certain length (a "retransmission timeout" or "RTO"), after which it may expire if no acknowledgement (or "ACK") or negative acknowledgment (or "NACK") is received. The length of the RTO may depend on recent samples of packet round trip time (or "RTT"), and thus may generally adapt to recent channel conditions such that an appropriate (e.g., sufficient but not excessive) amount of time is allotted to each packet. Note that one or more other uplink transmissions (e.g., with corresponding uplink retransmission timers) may also be in process in addition to the illustrated uplink communication.

If the retransmission timer expires (i.e., if a retransmission timeout occurs), the PS TCP may attempt to retransmit the data for which the retransmission timer was set. In this case, the PS TCP may again provide the data for uplink transmission to the PS RRC. If this happens repeatedly (e.g., a predetermined number of times, which may depend on network configuration of a network which operates according to the PS RAT and with which the UE 106 communicates using the PS RAT), the PS TCP may determine that channel conditions are poor, and may initiate one or more congestion recovery mechanisms and/or another response intended for use in poor channel conditions.

Congestion recovery mechanisms may include shortening a transmission window used by the PS TCP, reducing the amount of data transmitted, increasing the amount of error correction/detection used, and/or other techniques which may reduce bandwidth and/or increase transmission robustness. Such techniques may improve link use efficiency if channel conditions are indeed poor and the quality of the wireless link between the UE 106 and the network operating according to the PS RAT. However, if control of radio resources are shifted away from the PS RAT such that the operation of the PS RRC is suspended, such techniques would have no advantageous effect, as the shifting of radio resources within the UE 106 may be unrelated to channel conditions. Instead, such techniques may indeed have a negative effect on the efficiency with which actual link bandwidth is used once radio resources are shifted back to the PS RAT, since the actual radio link may support a greater bandwidth and lower latency than expected by the PS TCP based on the congestion recovery mechanism(s).

And indeed, as shown in FIG. 6, is may very well be possible that before the PS RRC has a chance to transmit the data provided for uplink transmission by the PS TCP, radio control may be shifted to the CS RRC and operations by the PS RRC may be suspended. For example, the data may have been placed in an uplink buffer (e.g., a first-in first-out or FIFO buffer) along with other uplink data to be transmitted, and the radio control shift may occur before the data corresponding to the illustrated uplink transmission is transmitted. In this case, the data may be stored in the uplink buffer at the PS RRC, possibly with other (e.g., previously and/or subsequently generated) uplink data which is also yet to be transmitted over the radio link.

However, by also providing an indication (a "PS radio suspend" or "PS RS" indication) of the radio control shift to the PS TCP, the PS TCP may be able to suspend its uplink retransmission timer(s) (e.g., for the illustrated uplink communication and potentially any other interrupted uplink communications). This may advantageously prevent the PS TCP from attempting to retransmit data which is sitting in the PS RRC buffers unable to be transmitted due to the "tune-away" of the radio to the CS RAT.

In some cases, as shown, the PS TCP may also initiate a "retransmission timeout guard interval" timer or "RTO GI" timer. The RTO GI timer may be initiated in order to prevent the uplink retransmission timer from being suspended indefinitely, e.g., in case the CS RAT ends up utilizing the shared radio (and thus preventing the PS RAT from resuming use of the radio) for an extended period of time, such as if a CS voice call is established on the CS RAT.

The radio multiplexer may shift radio control to the CS RRC in order to enable the CS RAT to check for paging messages. For example, the CS RAT may be operating in an idle-mode discontinuous reception (DRX) mode. In idle DRX, a RAT may generally actively operate (e.g., including using the radio and/or performing other functions) for short "wakeup" or "on-duration" periods of time, and operate in a reduced power state for longer periods of time between the wakeups in an alternating cyclical or regular/pre-defined periodic manner. During the active portion of the DRX cycle for a RAT, the UE may be configured to perform any of a variety of operations (e.g., specified by the RAT protocol and/or a network operator providing service according to the RAT). For example, common operations for a UE during a wakeup portion of a DRX cycle might include checking for (and potentially decoding) paging messages from a network, performing signal strength measurements for a serving cell and possibly also for neighboring cells, and potentially performing cell re-selection procedures depending on the results of any cell signal strength measurements.

If, as may be common, the CS RAT provides voice services while the PS RAT provides data services, it may be typical for the CS RAT to be given higher priority than the PS RAT, since voice calls may typically be considered a higher priority than data sessions. Thus, even though the PS RAT may be actively engaged in a data session (e.g., including the interrupted uplink communication, and potentially including additional uplink and/or downlink communications), the radio multiplexer may still temporarily suspend the PS RAT in order to provide radio control to the CS RAT, so that the CS RRC may check for paging messages, etc., according to the paging schedule configured for the UE according to the CS RAT. It should further be noted that in many cases, the PS RAT and the CS RAT may be operated independently of one another, such that at least some and possible all of the UE- and network-entities operating according to the PS RAT may be unaware (agnostic) of the existence of the CS RAT (e.g., including the paging schedule for the UE 106 according to the CS RAT), and vice versa.

The length of time for which the radio is provided to the CS RAT may depend on any number of factors. For example, the current radio channel conditions (e.g., poor/degraded conditions or good conditions) may have an influence on the amount of time required to complete any required operations by the CS RAT. As another example, at certain times (and/or in certain locations), the UE 106 may need to perform or update its registration according to the CS RAT (e.g., with a network with which the UE 106 communicates according to the CS RAT). Additionally, any incoming page for the UE 106 may result in an indefinite amount of radio time spent on the CS RAT, e.g., to service a CS call corresponding to the incoming page.

If there are no CS paging messages for the UE 106, the CS RRC may go to sleep (e.g., after finishing any other operations according to its configuration), as shown in FIG. 6. In this case, radio control may be returned to the PS RRC, which may in turn enable the PS RRC to complete uplink transmissions of any buffered uplink data over its radio link using the shared radio.

In addition, an indication (a "PS radio resume" or "PS RR" indication) may be provided to the PS TCP that radio control has been returned to the PS RRC. This may in turn enable the PS TCP to resume its uplink transmission timer for the uplink communication initiated prior to the "tune-away" (and potentially any other interrupted uplink communications).

If the uplink transmission is successfully received (e.g., by the PS network), the PS RRC may receive an ACK for that uplink data from the network. The PS RRC may in turn provide the ACK (or an indication thereof) to the PS TCP. Based on this indication that the uplink data was successfully received, the PS TCP may terminate/cancel the uplink retransmission timer for that uplink communication.

FIG. 7 illustrates a similar scenario as FIG. 6, up to and including the shift of radio control to the CS RAT and checking for CS paging messages by the CS RRC. However, the scenario illustrated in FIG. 7 differs from the scenario illustrated in FIG. 6 insofar as instead of not receiving any paging messages (i.e., as illustrated in FIG. 6), a paging message indicating an incoming CS call may be received in the scenario illustrated in FIG. 7.

Based on the paging message, the CS RAT may establish a CS call (e.g., a voice call) between the UE 106 and a calling party. If the call is accepted (e.g., by a user of the UE 106), the call may last for an indefinite amount of time. Even if the call is not accepted (e.g., unanswered or rejected), the process of setting up the call may take significantly longer than simply checking for paging messages and performing other scheduled on-duration activities, and so (e.g., depending on its configuration) it may be possible that the RTO GI timer may expire before radio control is transferred back to the PS RAT.

As will be readily recognized by those of skill in the art, the length of the RTO GI timer may be configured to be any length, including a pre-determined length or an adaptively/dynamically determined length, as desired. However, it may be particularly desirable, at least in some cases, to configure the length of the RTO GI timer at approximately (or slightly longer than) a typical "tune-away" time. For example, the RTO GI timer might be configured to be slightly longer than a typical amount of waking time (a typical "on-duration" length) used by the CS RAT in idle-mode, such that the RTO GI timer would generally not expire before radio control is returned to the PS RRC if the CS RRC performs an approximately average-length idle-mode DRX on-duration. As another possibility, the RTO GI timer may be configured with a length which may provide sufficient time for a typical call establishment procedure and alerting (e.g., ringing, vibrating, etc.) time by the CS RAT. However, it may be desirable to avoid configuring the RTO GI timer to be significantly longer than this, e.g., in order to avoid leaving the PS TCP in an active state with the retransmission timer suspended indefinitely, particularly if a CS call which might last an arbitrary amount of time has been established.

Accordingly, if a CS call is established on the CS RAT, the RTO GI timer may eventually expire. Once the RTO GI timer expires, the uplink retransmission timer associated with the previously initiated uplink transmission (and possibly any uplink retransmission timers associated with other interrupted uplink transmissions) may be resumed. If the CS call continues (e.g., as shown), the uplink retransmission timer may also eventually expire. The PS TCP may then continue/resume normal operations (potentially including one or more retransmission attempts, among various possibilities, depending on the configuration and state of the PS TCP) until a time-out or other closing condition occurs.

Note that while an incoming voice call may be one reason that a shift of radio resources to the CS RAT may be extended beyond a minimum length of time, other reasons may also be possible. For example, it may be possible that a paging message indicating that there is a short message service (SMS) message for the UE 106 may be received, and that the waking period according to the CS RAT may be extended in order to receive and decode the SMS message. As another possibility, radio resources might be shifted away from the PS RAT to the CS RAT in order to establish a user-initiated voice call (or SMS message, or any other communication utilizing the CS RAT). Accordingly, indications of such shifts of radio control away from and/or back to the PS RRC may also be provided to the PS TCP if desired, and similar actions (e.g., suspending/resuming uplink retransmission timer(s) based on such indications and/or an RTO GI timer) may correspondingly be performed as described hereinabove with respect to FIGS. 6-7.

Note also that the features described herein may be particularly applicable for relatively high speed (e.g., low latency) PS RATs. For example, since, as noted above, the RTO for the PS TCP retransmission timer may be based, at least in some cases, on the recent RTT samples (e.g., an average RTT). For a technology with a relatively high latency, it might be possible that the average RTT would tend to be as long as or longer than a typical tune-away period. In this case, expiration of the retransmission timer based on a tune-away to the CS RAT might be a relatively infrequent occurrence, in which case suspending the retransmission timer for each CS paging occasion might be unnecessary. However, as the RTT of the PS link approaches or is less than a typical CS RAT tune-away interval, the retransmission timer(s) might tend to expire more commonly during such tune-away times if not for the features described herein. This might result, as noted above, in various congestion recovery mechanisms being initiated by the PS TCP and/or other components of the PS RAT protocol stack, which may in turn lead to considerable degradation in TCP performance.

However, by implementing the features described in the present disclosure, it may be possible to advantageously avoid such TCP congestion recovery mechanisms and other techniques intended for use in poor channel conditions, which might otherwise be implemented as a result of radio resources being shifted away from the TCP's RAT. In particular, by informing the TCP layer of radio multiplexer activity, the TCP may temporarily suspend its retransmission timer(s) for pending uplink transmissions when the radio is not controlled by the TCP's RAT, and resume its retransmission timer(s) for pending uplink transmissions when the radio is again controlled by the TCP's RAT, or after expiration of a guard interval configured to avoid indefinite suspension of the retransmission timer(s) during extended tune-away periods.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, the UE comprising:
    a radio, comprising one or more antennas for performing wireless communication;
    a processing element operatively coupled to the radio;
    wherein the radio and the processing element are configured to:
        communicate with a first network according to a first radio access technology (RAT) using the radio, wherein the first network provides packet-switched (PS) communications using transmission control protocol (TCP);
        communicate with a second network according to a second RAT using the radio, wherein the second network provides circuit-switched (CS) communications, wherein the UE is configured to interrupt communicating with the first network according to the first RAT to communicate with the second network according to the second RAT using the radio;
        provide an indication that communicating with the first network according to the first RAT is being interrupted to a TCP layer of a protocol stack operating according to the first RAT in the UE,
        wherein the TCP layer is configured to suspend an uplink retransmission timer based on the indication that communicating with the first network according to the first RAT is being interrupted;
        provide an indication that communicating with the first network according to the first RAT is resumed to the TCP layer;
        wherein the TCP layer is configured to resume the uplink retransmission timer based on the indication that communicating with the first network according to the first RAT is resumed,
        wherein the TCP layer is configured to resume the uplink retransmission timer based on expiration of a retransmission timeout guard interval timer if no indication that communicating with the first network according to the first RAT is resumed is received prior to expiration of the retransmission timeout guard interval timer,
        wherein the retransmission timeout guard interval timer is initiated based on the indication that communicating with the first network according to the first RAT is being interrupted.

2. The UE of claim 1,
    wherein the first network and the second network are independently operated networks.

3. The UE of claim 1,
    wherein the UE is configured to interrupt communicating with the first network according to the first RAT to communicate with the second network according to the second RAT using the radio to check for paging messages according to a periodic paging cycle.

4. The UE of claim 3,
    wherein the periodic paging cycle is not known to the first network.

5. A method for improving transmission control protocol (TCP) uplink performance of a wireless user equipment (UE) device which multiplexes radio resources between a first radio access technology (RAT) and a second RAT, the method comprising:
    providing, at a first time, radio control to a radio resource control (RRC) entity that operates according to a first RAT, wherein the first RAT utilizes transmission control protocol (TCP) packet-switched (PS) communications;

providing, at a second time, radio control to a RRC entity that operates according to a second RAT, wherein the second RAT utilizes circuit-switched (CS) communications, wherein radio control by the RRC entity that operates according to the first RAT is suspended while radio control is provided to the RRC entity that operates according to the second RAT;

providing, at the second time, an indication to a TCP entity that operates according to the first RAT that radio control by the RRC entity that operates according to the first RAT is suspended, wherein the TCP entity that operates according to the first RAT is configured to resume the uplink retransmission timer based on expiration of a retransmission timeout guard interval timer if no indication that radio control by the RRC entity that operates according to the first RAT is resumed is received prior to expiration of the retransmission timeout guard interval timer, wherein the retransmission timeout guard interval timer is initiated based on the indication that radio control by the RRC entity that operates according to the first RAT is suspended.

6. The method of claim 5,
wherein radio control is provided to the RRC entity that operates according to the second RAT at the second time in order to check for paging messages according to the second RAT.

7. The method of claim 5,
wherein the TCP entity is configured to suspend an uplink retransmission timer based on the indication that radio control by the RRC entity that operates according to the first RAT is suspended.

8. The method of claim 5, the method further comprising:
returning, at a third time, radio control to the RRC entity that operates according to the first RAT;
providing, at the third time, an indication to the TCP entity that operates according to the first RAT that radio control by the RRC entity that operates according to the first RAT is resumed.

9. The method of claim 8,
wherein the TCP entity is configured to suspend an uplink retransmission timer based on the indication that radio control by the RRC entity that operates according to the first RAT is suspended;
wherein the TCP entity is configured to resume the uplink retransmission timer based on the indication that radio control by the RRC entity that operates according to the first RAT is resumed.

10. The method of claim 5,
wherein entities in the UE which operate according to the first RAT are agnostic of the existence of the second RAT.

11. A method for implementation by a wireless user equipment (UE) device, the method comprising:
initiating, at a transmission control protocol (TCP) layer of a protocol stack of a first radio access technology (RAT), an uplink communication, wherein initiating the uplink communication comprises providing data for uplink transmission to a radio resource control (RRC) entity of the first RAT;
initiating, at the TCP layer, a retransmission timer for the uplink communication;
receiving, at the TCP layer, an indication that the RRC entity of the first RAT is not currently in control of a radio of the UE;

suspending the retransmission timer for the uplink communication in response to the indication that the RRC entity of the first RAT is not currently in control of the radio of the UE;
initiating a retransmission timeout guard interval timer in response to receiving the indication that the RRC entity of the first RAT is not currently in control of the radio of the UE and suspending the retransmission timer;
determining that the retransmission timeout guard interval timer has expired; and
resuming the retransmission timer for the uplink communication in response to determining that the retransmission timeout guard interval timer has expired.

12. The method of claim 11,
wherein the indication that the RRC entity of the first RAT is not currently in control of the radio of the UE is received from an entity of the UE which multiplexes radio resources between the first RAT and a second RAT.

13. The method of claim 11, the method further comprising:
receiving, at the TCP layer, an indication that the RRC entity of the first RAT is currently in control of the radio of the UE;
resuming the retransmission timer for the uplink communication in response to the indication that the RRC entity of the first RAT is currently in control of the radio of the UE.

14. The method of claim 11,
wherein suspending the retransmission timer prevents the TCP layer from attempting to retransmit the uplink communication while UE radio resources are multiplexed away from the first RAT.

15. The method of claim 11,
wherein the indication that the RRC entity of the first RAT is not currently in control of a radio of the UE is received from an entity operating in the UE which multiplexes radio resources between the RRC entity of the first RAT and an RRC entity of a second RAT.

16. The method of claim 15,
wherein the second RAT provides circuit-switched (CS) voice communications, wherein radio resources are multiplexed from the RRC entity of the first RAT to the RRC entity of the second RAT in order for the RRC entity of the second RAT to check for paging messages according to the second RAT.

17. A non-transitory computer accessible memory medium comprising program instructions which, when executed at a wireless user equipment (UE) device, cause the UE to:
communicate according to a first radio access technology (RAT) using radio resources of the UE which are shared between the first RAT and a second RAT,
wherein the first RAT utilizes transmission control protocol (TCP) packet-switched (PS) communications,
wherein the second RAT utilizes circuit-switched (CS) communications,
wherein communicating according to the first RAT comprises a TCP layer providing data for uplink transmission to a PS radio resource control (RRC) layer, and the PS RRC layer transmitting the data using the shared radio resources;
provide the shared radio resources of the UE to a CS RRC layer of the second RAT according to a paging schedule for the second RAT,
wherein providing the shared radio resources of the UE to the second RAT interrupts communicating according to the first RAT such that the PS RRC layer is unable to transmit the data for uplink transmission while the shared radio resources of the UE are provided to the second RAT;

provide an indication to the TCP layer that the PS RRC layer does not have control of the shared radio resources of the UE based on providing the shared radio resources of the UE to the second RAT, wherein the TCP layer is configured to suspend an uplink retransmission timer for the data for uplink transmission based on the indication that the PS RRC layer does not have control of the shared radio resources of the UE, wherein the TCP layer is also configured to initiate a retransmission timeout guard interval timer in response to receiving the indication that the PS RRC layer does not have control of the shared radio resources of the UE, wherein the TCP layer is also configured to resume the uplink retransmission timer upon expiration of the retransmission timeout guard interval timer.

18. The memory medium of claim 17, wherein the program instructions further cause the UE to:

return the shared radio resources of the UE to the PS RRC layer after the CS RRC layer checks for paging messages using the shared radio resources of the UE;

provide an indication to the TCP layer that the PS RRC layer does have control of the shared radio resources of the UE;

wherein the TCP layer is configured to resume the uplink retransmission timer for the data for uplink transmission based on the indication that the PS RRC layer does have control of the shared radio resources of the UE.

19. The memory medium of claim 17, wherein the paging schedule for the second RAT is not known by components of the UE operating according to the first RAT.

20. A wireless user equipment (UE) device, the UE comprising:

a radio, comprising one or more antennas for performing wireless communication;

a processing element operatively coupled to the radio;

wherein the radio and the processing element are configured to:

provide, at a first time, radio control to a radio resource control (RRC) entity that operates according to a first RAT, wherein the first RAT utilizes transmission control protocol (TCP) packet-switched (PS) communications;

initiate, at the first time, by a TCP entity that operates according to the first RAT, an uplink communication, wherein initiating the uplink communication comprises providing data for uplink transmission to the RRC entity that operates according to the first RAT;

initiate, at the first time, by the TCP entity that operates according to the first RAT, a retransmission timer for the uplink communication;

provide, at a second time, radio control to a RRC entity that operates according to a second RAT, wherein the second RAT utilizes circuit-switched (CS) communications, wherein radio control is provided to the RRC entity that operates according to the second RAT at the second time in order to check for paging messages according to the second RAT, wherein radio control by the RRC entity that operates according to the first RAT is suspended while radio control is provided to the RRC entity that operates according to the second RAT, wherein the RRC entity that operates according to the first RAT is not able to transmit the data for uplink transmission at the second time based on radio control by the RRC entity that operates according to the first RAT being suspended at the second time;

provide, at the second time, an indication to the TCP entity that operates according to the first RAT that radio control by the RRC entity that operates according to the first RAT is suspended;

suspend, at the second time, by the TCP entity that operates according to the first RAT, the retransmission timer for the uplink communication in response to the indication that radio control by the RRC entity that operates according to the first RAT is suspended;

initiate, at the second time, by the TCP entity that operates according to the first RAT, a retransmission timeout guard interval timer in response to receiving the indication that radio control by the RRC entity that operates according to the first RAT is suspended and suspending the retransmission timer, wherein suspending the retransmission timer prevents the TCP entity that operates according to the first RAT from attempting to retransmit the uplink communication while the RRC entity that operates according to the first RAT is not able to transmit the data for uplink transmission;

determine, at a third time, by the TCP entity that operates according to the first RAT, that the retransmission timeout guard interval timer has expired;

resume, at a third time, by the TCP entity that operates according to the first RAT, the retransmission timer for the uplink communication in response to determining that the retransmission timeout guard interval timer has expired.

* * * * *